United States Patent [19]
Bryan, Jr. et al.

[11] Patent Number: 5,559,301
[45] Date of Patent: Sep. 24, 1996

[54] TOUCHSCREEN INTERFACE HAVING POP-UP VARIABLE ADJUSTMENT DISPLAYS FOR CONTROLLERS AND AUDIO PROCESSING SYSTEMS

[75] Inventors: Marcus K. Bryan, Jr.; Alexander J. Limberis; John S. Bowen, all of San Jose; Daniel A. Phillips, Palo Alto, all of Calif.

[73] Assignee: Korg, Inc., Tokyo, Japan

[21] Appl. No.: 306,365

[22] Filed: Sep. 15, 1994

[51] Int. Cl.$^6$ ............... G10H 1/057; G10H 1/06; G10H 1/08; G10H 1/46
[52] U.S. Cl. ............... 84/653; 84/659; 84/660; 84/663; 84/665; 345/173; 395/159
[58] Field of Search ............... 84/600, 615–620, 84/622–633, 653–665, 477 R, 478, 462; 345/173–178; 395/159

[56] References Cited

U.S. PATENT DOCUMENTS

| | | | |
|---|---|---|---|
| 5,027,689 | 7/1991 | Fujimori | 84/659 X |
| 5,146,833 | 9/1992 | Lui | 84/477 R X |
| 5,153,829 | 10/1992 | Furuya et al. | 84/477 R X |

OTHER PUBLICATIONS

Rubine, et al., "Programmable Finger Tracking Instrument Controllers"; Computer Music Journal, vol. 14, No. 1, Spring, 1990.

Primary Examiner—Stanley J. Witkowski
Attorney, Agent, or Firm—Haynes & Davis

[57] ABSTRACT

A touchscreen interface for a sound processing system, such as music synthesizers, which has a display panel and a touch sensitive panel overlying the display panel, includes an icon which represents an adjustable parameter used by the processing system. The processing resources supply a variable adjustment display to the display panel in response to a touch on the position of the icon, using pop-up slider or pop-up knob motif. The variable adjustment display overlies the interface display and has a size on the touch sensitive panel larger than the size of the icon to facilitate manipulation of the variable using a finger over a significant range of values. The variable adjustment display pops up when touched to obscure a portion of the graphical display used for the interface. When the variable is adjusted using the touch sequence, the variable adjustment display is removed, and the interface display is left unobscured. This allows the user to manipulate a particular variable while maintaining the window which shows the values of related variables on the screen. By maintaining the current window on the screen, the user is less likely to get lost in a hierarchy of windows used for setting variables.

44 Claims, 6 Drawing Sheets

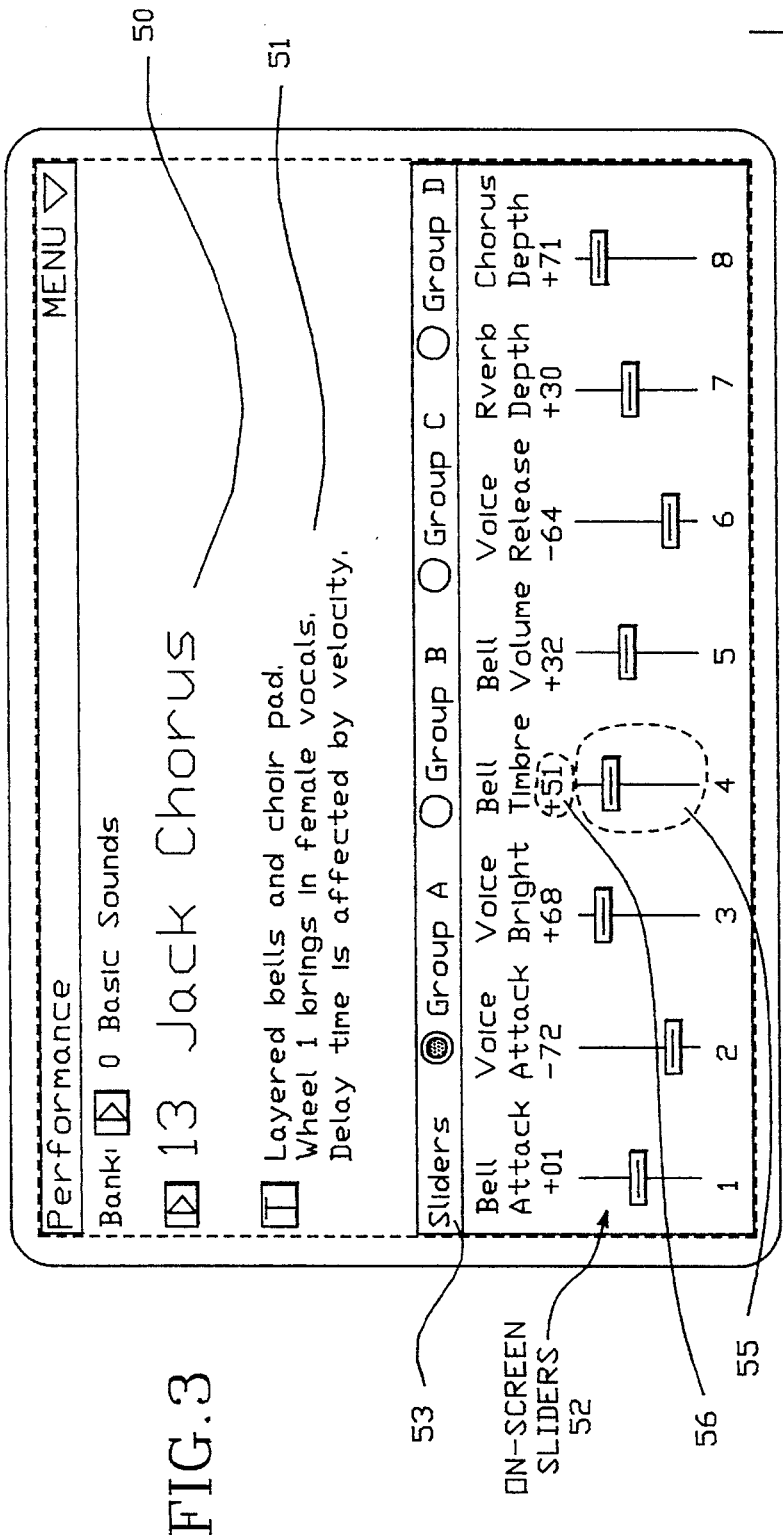

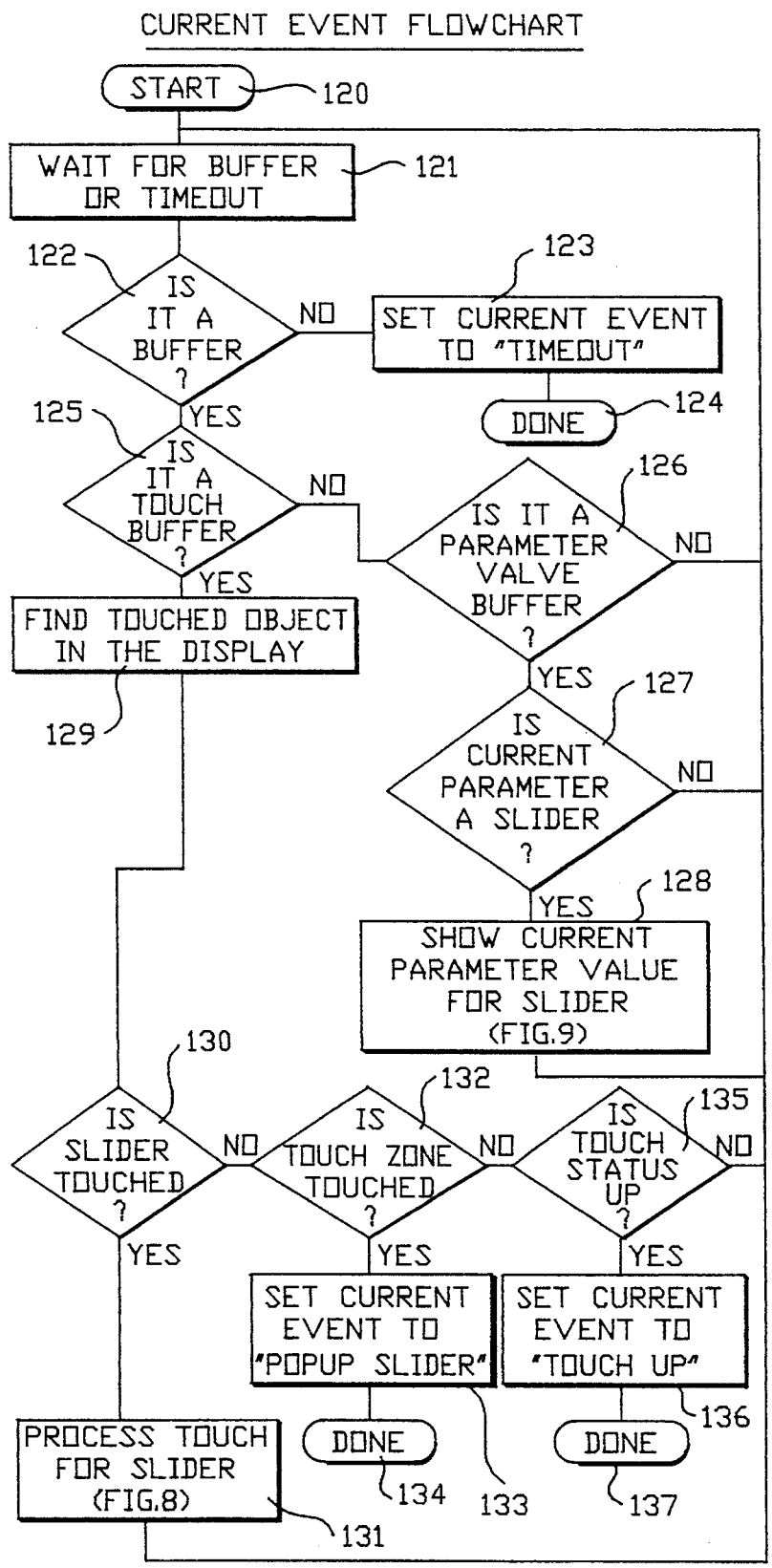
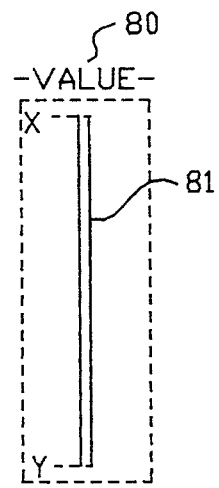
FIG.7A
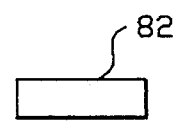
FIG.7B
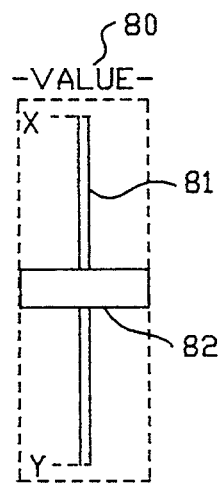
FIG.7C
FIG.6

SLIDER FLOWCHARTS

"GRAB"

"TOUCH"

"DRAG"   "LIFT"

"POP-UP"

"UPDATE"

TOUCHSCREEN INTERFACE HAVING POP-UP VARIABLE ADJUSTMENT DISPLAYS FOR CONTROLLERS AND AUDIO PROCESSING SYSTEMS

BACKGROUND OF THE INVENTION

1. Field of the Invention

The present invention relates to graphical user interface systems; and more particularly to touchscreen interfaces for use with controllers and processing systems such as music synthesizers, or other sound processors.

2. Description of Related Art

Classical musical instrument control devices have been mechanical, sometimes having electrical couplings. For instance, sliders and knobs used on traditional mixers and music synthesizers are often connected to potentiometers for setting variables. Musicians have learned to utilize these instruments with the familiar sliders and knobs and other mechanical switches for the purposes of setting parameters of a performance to be synthesized by the device. For background concerning controls on musical instruments, see Rubine, et al., "Programmable Finger Tracking Instrument Controllers," COMPUTER MUSIC JOURNAL, Vol. 14, No. 1, Spring, 1990.

As sound synthesis techniques become more computerized, the flexibility of the traditional mechanical user interface on a music synthesizer or other sound processor is strained. Accordingly, it is desirable to use graphical user interfaces with such devices, incorporating their greater ease of use for complicated data processing interfaces.

However, prior art graphical interfaces typically require either a mouse or other computerized pointing device. Typically, these techniques require a relatively large screen, which is impractical for music synthesizers which are used during a performance. Thus, the use of a relatively small, flat panel touchscreen is desirable for these applications.

However, the small display which is used for displaying the user interface limits the range of motion that can be used to set parameters, and limits the number of parameters that might be adjusted based on a single display. This requires a rather deep hierarchy of menus and windows for the purposes of setting parameters associated with a particular performance to be synthesized.

Accordingly, it is desirable to provide a graphical user interface method and apparatus which allows use of relatively small touchscreen displays with music synthesizers or other sound processing systems, yet provides improved flexibility in the range of values which may be set using the interface, and the number of variables which may be manipulated with a single interface screen.

SUMMARY OF THE INVENTION

The present invention provides a touchscreen interface for a controller which comprises a display panel and a touch sensitive panel overlying the display panel. Processing resources are coupled with the display panel and the touch sensitive panel which supply an interface display to the display panel. The interface display includes an icon which represents an adjustable parameter used by the processing system. In addition, the processing resources supply a variable adjustment display to the display panel in response to a touch on the position of the icon. The variable adjustment display "pops up" to overlie the interface display, and has a size on the touch sensitive panel larger than the size of the icon to facilitate manipulation of the variable using a finger over a significant range of values. The processing resources adjust the variable parameter and remove the variable adjustment display from the display panel in response to a touch sequence on the touch sensitive panel over the variable adjustment display.

Thus, when the variable is adjusted using the touch sequence, the variable adjustment display is removed, and the interface display is left unobscured. This allows the user to manipulate a particular variable while keeping the window which shows the values of related variables on the screen. By keeping the current window on the screen, the user is less likely to get lost in a hierarchy of windows used for setting variables. This feature is particularly important for music synthesizers or other systems which synthesize a performance requiring manipulation of a number of variables with the skill of a musician.

According to one aspect of the invention, the icon on the interface display may comprise a symbol suggesting a slider, and display a current value for the variable adjacent the symbol. When the user touches the icon, the variable adjustment display pops up. This display will resemble a slider, having a slider bar and a slider background. The slider background will include a scale, indicating a range of possible values for the variable parameter. The processing resources adjust the variable parameter and remove the variable adjustment display in response to a touch sequence, including detection of a touch over the slider bar on the touch sensitive panel, detection of a drag of the touch on the touch sensitive panel to a new position on the slider background representing a selected parameter value, and detection of a lift of the touch at the new position.

Another representative variable adjustment display, according to the present invention, will resemble a knob, having a knob handle and a knob background. The user manipulates the knob handle on the variable adjustment display so that it points to a selected variable parameter. The touch sequence used for manipulating the knob may be similar to that described above for the slider.

According to one aspect of the invention, a user interface based on the touch sensitive panel described above is applied to a sound synthesizer which adjusts variable parameters associated with the synthesized sounds. In this aspect, the interface display will include a plurality of icons representative of respective adjustable parameters used by the sound synthesizer. The processing resources supply a variable adjustment display in response to a touch on the position of a particular icon, where the variable adjustment display provides the tools for selecting a new value for the corresponding variable.

The present invention can also be characterized as a method for setting a variable used by a processing system having a touchscreen. The method is based on the use of pop-up variable adjustment displays as described above.

According to yet another aspect of the invention, the invention can be characterized as a method for adjusting parameters associated with a synthesized performance in a sound processing system having a touchscreen. The method, according to this aspect, includes the steps of:

supplying an interface display to the touchscreen having a plurality of variable icons representative of respective adjustable parameters used by the processing system in producing the synthesized performance, said icons having respective sizes and positions on the touchscreen;

supplying a variable adjustment display to the touchscreen in response to a touch on the position of a particular icon in the plurality of icons, the variable adjustment display overlying said interface display and having a size on the touchscreen larger than the size of said particular icon; and adjusting the adjustable parameter represented by the particular icon and removing the variable adjustment display from the touchscreen, in response to a touch sequence on the touchscreen over the variable adjustment display.

The variable icons for the sound synthesizing system, according to the present invention, represent audio parameters associated with the synthesized performance, including combinations of attack, brightness, release, timbre, volume, and depth, as are appropriate to the particular sounds being included in the performance.

Accordingly, the present invention provides a flexible user interface technique which may be applied to controllers, music synthesizers, recorders, mixers, and other sound processing systems that allows for precise adjustment of parameters associated with a performance using a relatively small touchscreen on the front panel of the synthesizing device. This technique greatly increases the ease of use of a complicated sound processing device by allowing adjustment of a relatively large number of parameters based on a single interface display, while preventing the user from becoming lost among a hierarchy of windows.

This process is centered around the musician, not the technology. Since no two musicians do things in exactly the same way, this interface provides a musician maximum flexibility, making few assumptions about the way that a musician actually works. This system facilitates a musician's real-time needs which can be changed from session to session, from gig to gig, and from minute to minute.

In addition to audio processor systems, the controller of the present invention can be applied to thermostats, volume and picture quality controllers for video systems, signal strength controllers, attenuators, speed controllers such as for toy trains, or other uses which benefit from a graphical user interface on a touchscreen.

Other aspects and advantages of the present invention can be seen upon review of the figures, the detailed description, and the claims which follow.

BRIEF DESCRIPTION OF THE FIGURES

FIG. 3 is a representative window showing a plurality of variable icons according to the present invention.

FIGS. 4A–4E illustrate the touch sequence used for manipulating a variable using the pop-up slider motif of the present invention.

FIG. 6 is a flow chart of the "Set Current Event" process used in the algorithm of FIG. 5.

FIGS. 7A–7C illustrate slider background, a slider bar, and the combination of the slider background and the slider bar for the graphical variable adjustment display of the present invention.

DETAILED DESCRIPTION

Figure 1:
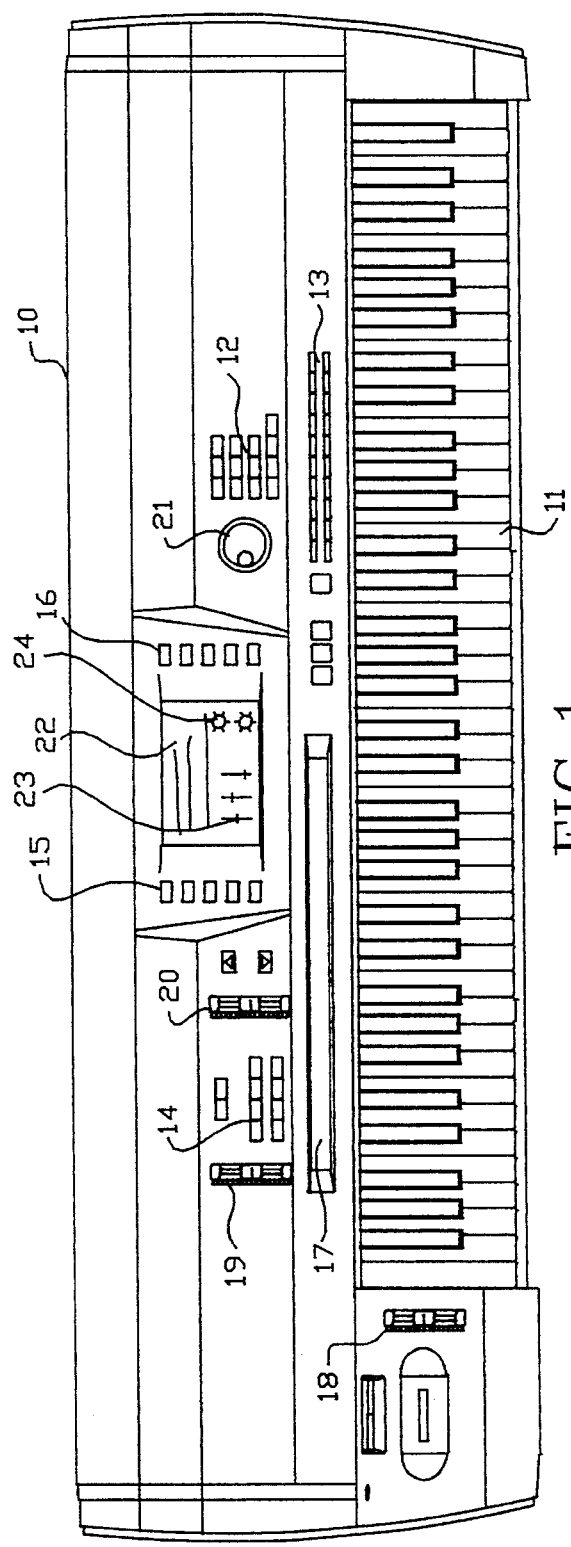
FIG. 1 is a drawing of a front panel of a music synthesizer with a touchscreen interface according to the present invention.
Figure 2:
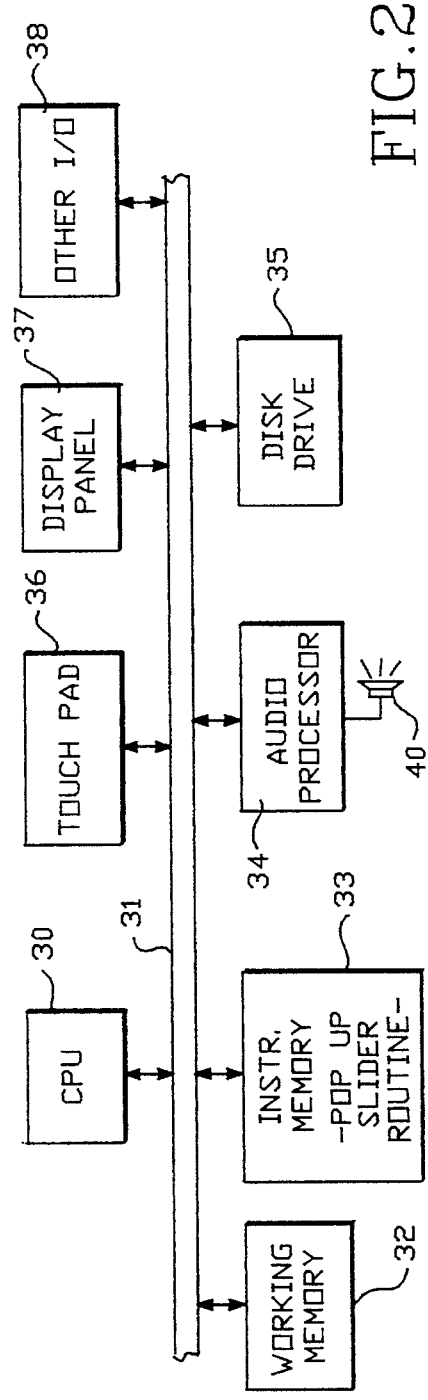
FIG. 2 is a block diagram of processing resources coupled with the touchscreen interface of the present invention.

A detailed description of preferred embodiments of the present invention is provided with respect to FIGS. 1–10, in which FIGS. 1 and 2 illustrate a representative hardware environment for the graphical user interface of the present invention, and FIGS. 3–10 illustrate representative interface techniques.

In FIG. 1, a music synthesizer front panel 10 is illustrated. The front panel includes a keyboard, generally 11, and a number of keypads, such as a numerical keypad 12, a function keypad 13, function keypad 14, and display panel button sets 15 and 16. Also on the front panel are a ribbon controller 17, and a number of physical sliders 18, 19, and 20. The front panel also includes other physical switches, such as the wheel 21 (or "knob"). These physical switches are either hardwired to specific functions and are so labelled on the front panel, or are programmed for a given synthesis performance to be used for a performance specific function.

The front panel, according to the present invention, also includes a touchscreen 22 which is about 4 inches by about 6 inches in size. The touchscreen includes a display panel, and a touch sensitive pad overlying the display panel. As schematically illustrated in FIG. 1, the display panel displays an interface display including a plurality of icons, such as icon 23, which is representative of a particular variable which might be adjusted by a slider, and icon 24 which is representative of a particular variable which might be adjusted by a knob.

Associated with the front panel shown in FIG. 1, are processing resources, such as those illustrated in FIG. 2. These processing resources include a central processing unit CPU 30 coupled to a bus 31. Working memory 32 and instruction memory 33 are also coupled to the bus 31. The instruction memory 33, according to the present invention, stores routines for controlling the user interface and the touchscreen, such as a pop-up slider routine described below. The bus 31 may also be coupled to a disk drive 35 or other non-volatile memory system, as known in the art.

Also coupled to the bus 31 is an audio processor 34 which generates audio data for a particular performance being synthesized. The audio processor 34 drives a speaker system suitable for the particular performance being executed, represented by the symbol 40. The audio processor may be replaced by other resources such as software executed by the CPU 30 itself.

The bus 31 is also coupled to the touch pad 36 and display panel 37 which, together, provide a touchscreen 22 for the front panel of the device. Also coupled to the bus 31 are other I/O devices, including the physical switches on the front panel, and potentially other devices as known in the art. These other I/O devices are collectively represented by block 38.

The block diagram illustrated in FIG. 2 is representative of basic data processing resources which may be used with a mixer, recorder, or other audio processing system, like the music synthesizer illustrated in FIG. 1. A preferred system may include resources such as those described in co-pending U.S. patent application entitled OPEN ARCHITECTURE MUSIC SYNTHESIZER WITH DYNAMIC VOICE ALLOCATION, application No. 08/016,865, filed Feb. 10, 1993, which is incorporated by reference herein for the purposes of illustrating one particular system which might be represented generically by FIG. 2 in the present application. Alternatively, for controllers in simpler applications, such as thermostats and the like, the processing resources may be implemented with application-specific circuits.

FIG. 3 illustrates a representative interface display which will be provided to the touchscreen by the processing resources of FIG. 2 according to the present invention. The interface includes a label 50 identifying the performance to be synthesized which, in this example, is called "Jack Chorus." Also, text 51 is included on the interface describing characteristics of the "Jack Chorus." In this example, the "Jack Chorus" consists of a layered bells and choir performance. Manipulation by the user of a knob called "wheel 1" on the front panel brings in female vocals. The delay time associated with bringing in the female vocals is affected by the velocity that the wheel is turned.

Also shown on the interface is a window 52 which illustrates a bank of sliders 1–8. The window 52 also includes a group selection bar 53. By touching one of the buttons, such as button 54, a group of onscreen sliders is selected for display in the window 52.

As can be seen, the onscreen sliders are icons representative of variables which can be adjusted using the user interface. The icons include a symbol, such as symbol enclosed by circle 55 and a current value field such as the field encircled by circle 56. Furthermore, in this embodiment, the name of the variable that is represented by the icon 55 is shown onscreen.

The variables that are adjusted using this interface include such parameters associated with synthesis of music as attack, brightness, timbre, volume, .release, and depth. The combinations of parameters that would be adjusted for particular basic sound will differ depending on the particular composition.

As can be seen, a large number of icons 55 is displayed on a relatively small touchscreen. Thus, the value of these parameters could not be readily adjusted using a finger as the touch device over a significant range, or with significant accuracy. Accordingly, the present invention has provided the pop-up slider technique which is schematically illustrated in FIGS. 4A–4E.

FIG. 4A illustrates an icon, such as icon 55 from FIG. 3. A fingertip 60 is shown schematically touching the icon 55. Processing resources are responsive to a touch on the icon 55, to cause a variable adjustment display, generally 61, to pop-up on the screen as shown in FIG. 4B. This display overlies the interface display shown in FIG. 3 and obscures the icon being adjusted, and possibly other regions of the screen. The variable adjustment display 61 is significantly larger than the icon 55 as illustrated by the relative sizes of the finger 60 in the display.

As shown in FIG. 4B, the variable adjustment display resembles a slider which pops up on the screen. The user's finger 60 will lie at the position of the icon prior to popping up of the graphical slider. The graphical slider will include a slider bar 63 and a background, generally 64. The background 64 will indicate a range of values over which the slider can be used to adjust the parameter, and a current value, generally 65, of the parameter.

When the pop-up slider appears on the screen, the processing resources will monitor the touchscreen for a particular touch sequence. In particular, as illustrated in FIG. 4C, the resources wait for a touch on the slider bar 63 of the pop-up slider by which the user "grabs" the slider bar. The user may be required to drag his or her finger 60 without lifting it from the touchscreen as indicated at arrow 66 to the current position of the slider bar 63, or the touchscreen may simply wait until a touch on the slider bar 63 is detected, independent of whether the touch is lifted or not in between. Upon "grabbing" the slider bar 63, the touchscreen monitors for a drag of the touch of the slider bar to a new position as illustrated in FIG. 4D. As the slider bar 63 is being dragged, as represented by arrow 67, to the new position, the value field 65 will be updated to display the value represented by the position of the slider bar 63. When the user moves the slider bar 63 to a position which corresponds to the value desired, then the user lifts the finger 60. When the user lifts the finger, the new value of the parameter is sent to the appropriate data location, so it may be used by the processing resources, and the variable adjustment display composed of the background 64 and the slider bar 63 are removed from the screen, leaving the original icon 55. When the icon 55 is associated with a current value field 56, such as shown in FIG. 3, then the current value field 56 is updated when the pop-up slider is removed.

In summary, the process begins with a slider icon displayed on the user interface showing a current value. The user puts the finger down on the slider icon, the finger being generally larger than the slider handle on the icon. After, for example, 200 milliseconds of holding down the touch, the pop-up slider appears. If the finger is lifted, the pop-up slider disappears and uncovers the interface display without changing the value. The user slides the finger up to the handle to "grab" the handle. Then, continuing to slide the finger, the value of the parameter is adjusted. After adjusting the parameter to the desired value, the finger is lifted up, the pop-up slider disappears, and the original interface is uncovered with a new value shown adjacent the icon. The processing resources may also be programmed to detect the velocity of the "drag," and provide parameters to the appropriate routine based on the velocity.

More details concerning the routine executing by the processing resources to perform this sequence are provided with respect to FIGS. 5–9.

Figure 5:
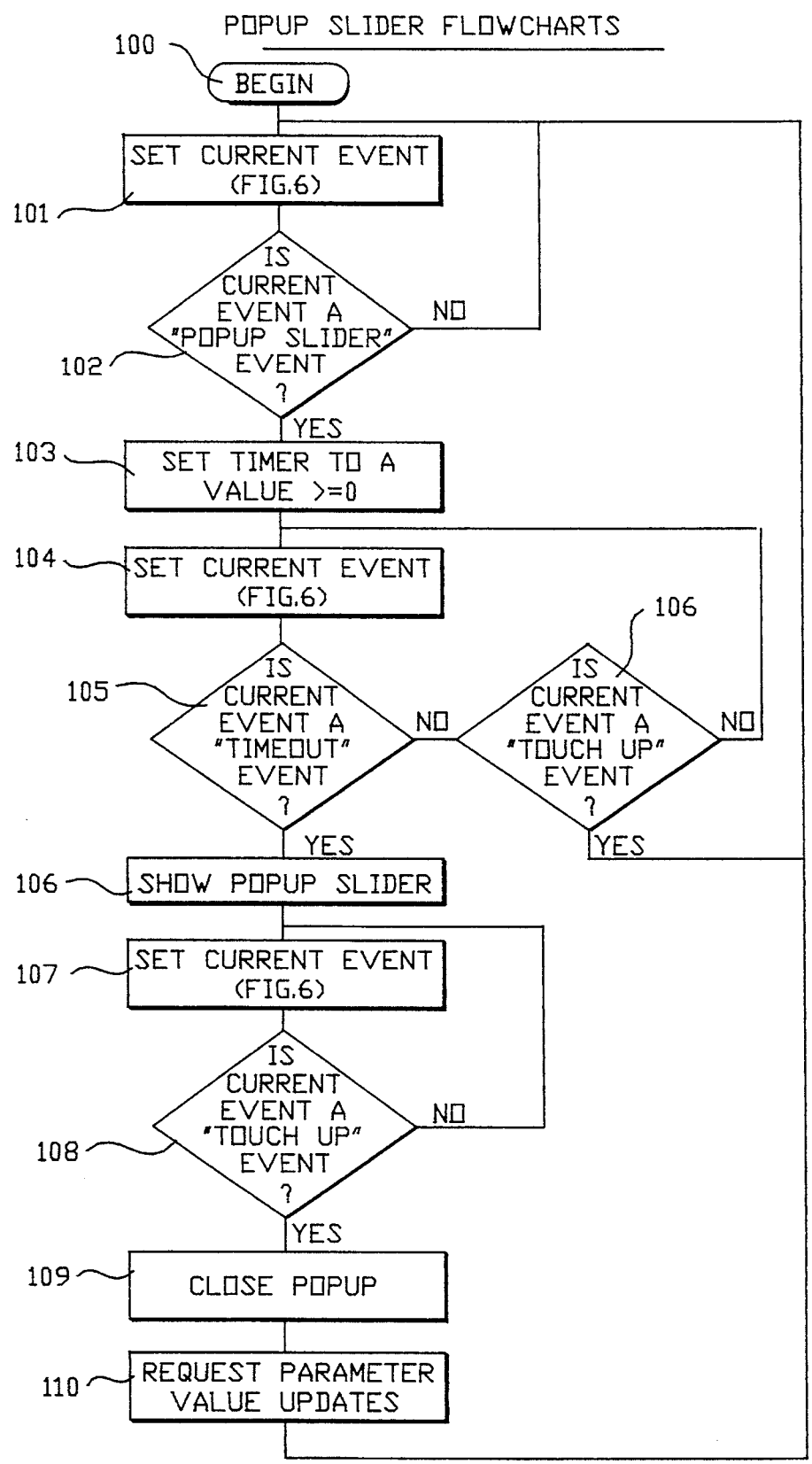
FIG. 5 is a flow chart of the algorithm executed by the processing resources for a pop-up slider touch sequence.

FIG. 5 is a flow chart of the main algorithm for the pop-up slider routine. The algorithm begins at block 100. Next, it executes a "Set Current Event" routine 101, which is illustrated with respect to FIG. 6. After setting the current event, the algorithm determines whether the current event is a "pop-up slider" event in block 102. If not, then the algorithm loops back to block 101. If it is a pop-up slider event, then the timer is set to a preselected value greater than zero, e.g., 200 milliseconds (block 103). After setting the timer, the Set Current Event routine is executed again (block 104). After setting the current event, the algorithm determines whether the current event is a timeout event at block 105. If it is not a timeout event, then it is determined whether the current event is a touchup event 106, corresponding to lifting the finger. If it is not a touchup event, then the algorithm loops back to block 104 and continues monitoring for a timeout event. If it is a touchup event, then the algorithm loops back to block 101 to begin monitoring for a pop-up slider event.

If, at block 105, a timeout is detected, then the pop-up slider graphic is sent to the display (block 106). After showing the pop-up slider, the Set Current Event routine is executed (block 107). The pop-up slider may be positioned near the touch on the icon to facilitate a touch sequence which requires the user to keep the touch down until the adjustment is complete. In alternative systems, the pop-up slider can be positioned elsewhere on the screen, such as in a consistent position for all variables.

After executing the Set Current Event routine at block 107, the algorithm determines whether a touchup event has occurred at block 108. If not, then the algorithm loops to block 107 to monitor for a touchup event. If a touchup event is detected at block 108, then the pop-up slider is closed at block 109, and the algorithm requests parameter value updates at block 110 for other routines executed by the processing resources using the parameter. After requesting updates at block 110, the algorithm loops back to block 101 to continue monitoring for pop-up slider events.

The "Set Current Event" flow chart begins with block 120 in FIG. 6. The routine waits for a message buffer event or a timeout, as indicated at block 121. At block 122, it determines whether the detected event is a message buffer. If not, then it is a timeout event and the current event parameter is set to timeout at block 123, and the process is done, as indicated at block 124 returning to the corresponding location in the process of FIG. 5.

Figure 9:
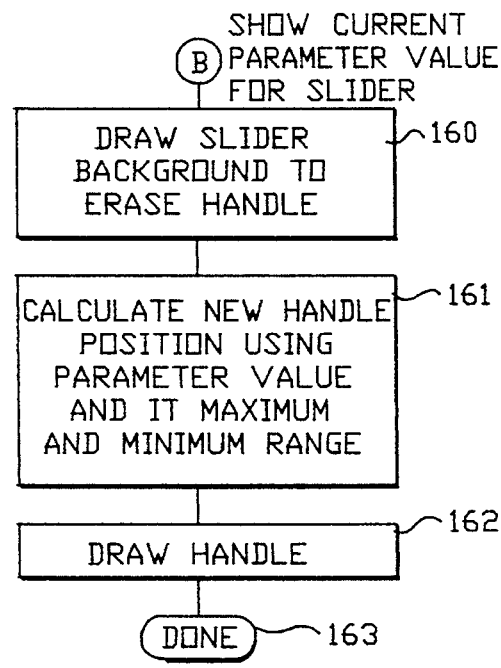
FIG. 9 is a flow chart of the "Show Current Parameter Value" process which is executed in the process of FIG. 6.

If a message buffer was detected at block 122, then it is determined whether the message comes from a touchscreen manager, indicating a touch on the touchscreen. If it is not, then it is determined whether it is a parameter value buffer sent from a parameter editor routine in the processing resources. If not, then the algorithm returns to wait for a message buffer at block 121. If it is a parameter value buffer, then it is determined whether the parameter corresponds to a particular slider icon or pop-up slider on the screen. If it does not, then the algorithm loops back to block 121. If it does relate to a slider, then the "Show Current Parameter Value for Slider" routine illustrated in FIG. 9 is executed (block 128). After updating the parameter value on the display icon or the displayed pop-up slider, the algorithm loops back to block 121.

Figure 8:
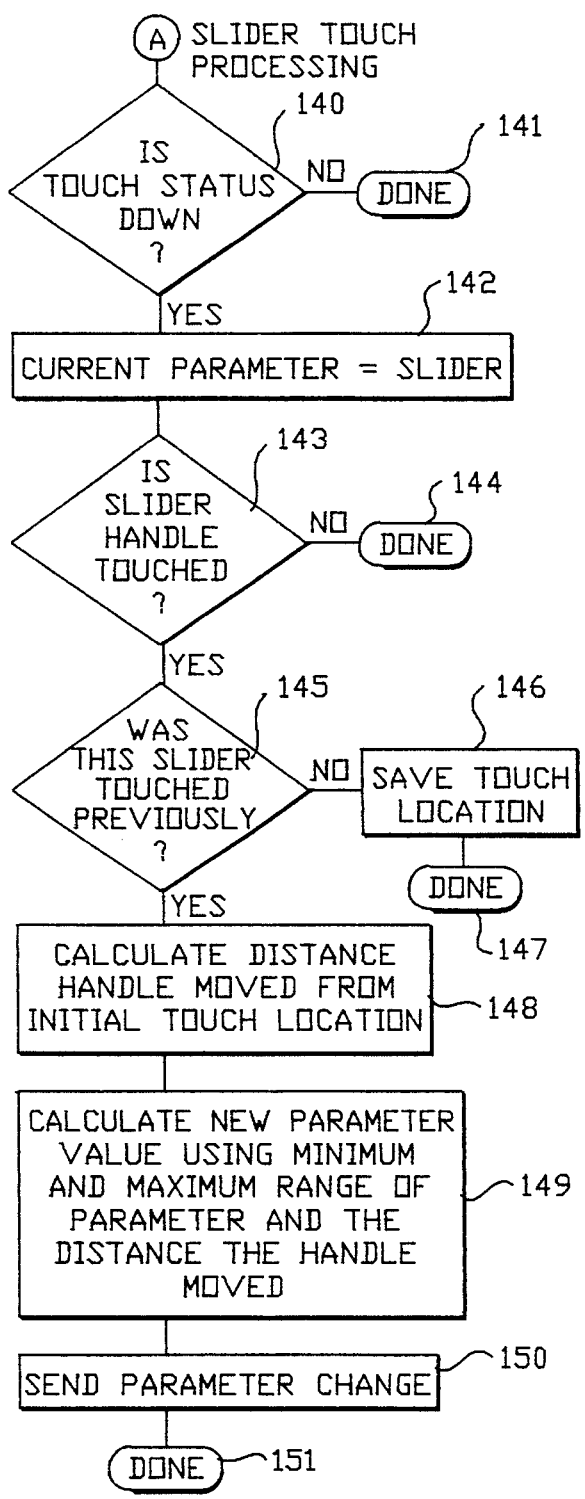
FIG. 8 is a flow chart of the "Slider Touch Processing" initiated by the process of FIG. 6.

If, at block 125, a touch buffer is detected, then the touched object on the screen is determined at block 129. If the touched object is a slider icon, as indicated at block 130, then the "Process Touch for Slider" routine of FIG. 8 is executed (block 131). If the object touched at block 130 is not a slider, then it is determined whether a touch zone is touched, as indicated at block 132. A touch zone is a region on the screen corresponding to a pop-up slider. If it is a touch zone, then the current event is set to pop-up slider, as indicated at block 133, and the algorithm returns to the process of FIG. 5, as indicated at block 134. If the object touched is not a touch zone (touch dragged outside of touch zone), then the algorithm determines whether the touch status is up, corresponding to a lifted touch (block 135). If the touch has not been lifted, then the algorithm loops to block 121 to wait for a buffer message. If the touch is lifted, then the current event is set to touchup, as indicated at block 136, and the algorithm is done at block 137 returning to the process of FIG. 5.

FIGS. 7A–7C are used to illustrated slider terminology for the flow chart of FIG. 8. Thus, the slider icon will consist of a slider background, as shown in FIG. 7A, which includes a current value field 80, a slide symbol 81, and an indication of the range of values which can be achieved by this slider, such as a top maximum value X, and a minimum value Y.

As illustrated in FIG. 7B, a slider bar 82 is a second portion of the pop-up slider graphic. FIG. 7C illustrates the combination of the background including the current value field 80, the slide symbol 81, and the slider bar 82.

In one embodiment of the present invention, the icons on the screen use the same graphic as the pop-up slider. The pop-up slider is graphically an expanded version of the icon. Thus, the slider background and slider bar are drawn on the screen using the same basic routine whether or not it is displayed as an icon, or as a pop-up slider.

FIG. 8 illustrates the "Process Touch for Slider" routine which is entered at block 131 of FIG. 6. The algorithm begins by determining whether the touch status is down at block 140. If not, the algorithm is done at block 141 returning to the process of FIG. 6. If the touch status remains down, then the current parameter is set equal to a slider at block 142. Next, the algorithm determines whether the slider handle is being touched at block 143. If not, the algorithm is done, as indicated at block 144, returning to the process of FIG. 6. If the slider handle is touched, the algorithm determines whether the slider handle had been previously touched at block 145. If not, then this is the first time the slider handle has been touched during this touch sequence, and the touch location is saved at block 146. Then the algorithm returns to the process of FIG. 6, as indicated at block 147. If it had been touched previously, then the distance the handle has moved from the initial touch location to the current touch location is calculated at block 148. Next, the new parameter value is calculated using the minimum and maximum range of the parameter, and the distance the handle had moved at block 149.

Next, the parameter change is sent to the parameter management software, as indicated at block 150, and the process is done at block 151, returning to the algorithm of FIG. 6.

FIG. 8 illustrates the "Show Current Parameter Value for Slider" routine which is entered at block 128 of FIG. 6. This algorithm begins at block 160 by drawing the slider background to erase the handle of the slider on the screen. Next, a new handle position using the parameter value and its maximum and minimum range is determined at block 161. Finally, the handle is drawn at the new position (block 162) over the background to provide the new slider on the screen. Then, the process is done, as indicated at block 163 returning to the algorithm of FIG. 6. This process applies to both the icon and the pop-up slider in the embodiment where the icon and the slider use the same graphic, just of different sizes.

Basically, the routines of FIGS. 5–9 can be summarized for pop-up slider event as follows. If at block 101 of FIG. 5, a pop-up slider event, such as set at block 133 of FIG. 6, is detected, then the timer is set to ensure that the slider icon is touched for 200 milliseconds. Once it has been touched for the timeout event, without having lifted the finger, the pop-up slider appears on the screen. The current event flow chart will process the touch sequence for the slider executing the routine of FIG. 8 which results in sending a new parameter value to the process. This new parameter results in redrawing the slider on the screen, using the process of FIG. 9, and continuing to wait for a touchup event. The touchup event causes the pop-up to be closed, and the parameter value to be updated with a new value.

FIGS. 3–9 illustrate a variable adjustment graphic based on the pop-up slider motif. In FIGS. 10A–10F, a pop-up knob motif is illustrated. The term "knob" is meant to include "wheel," as such term is applied to knobs in the sound processing field. It will be appreciated that a variety of other graphical adjustment displays may be adapted to the process of the present invention.

Figure 10A:
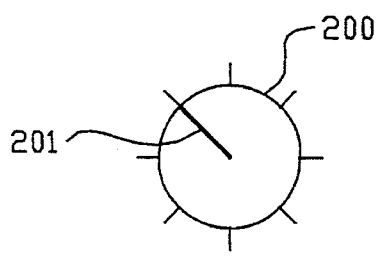
FIGS. 10A–10F illustrate a pop-up adjustment knob sequence according to the present invention.

Thus, the pop-up knob motif illustrated in FIGS. 10A–10F begins with a knob icon 200, as shown in FIG. 10A. This knob icon includes an indicator 201 of the current value of the knob.

Figure 10D:
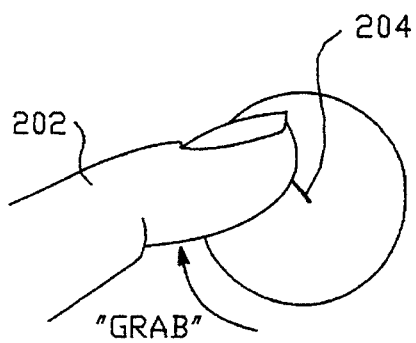
Figure 10B:
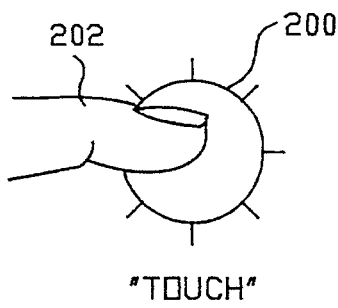
Figure 10E:
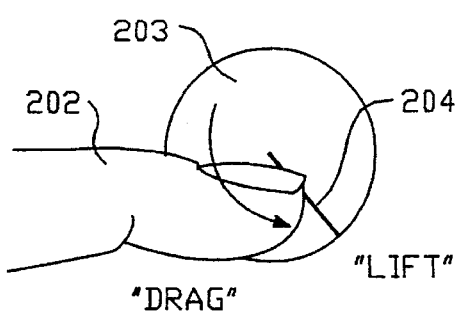
Figure 10C:
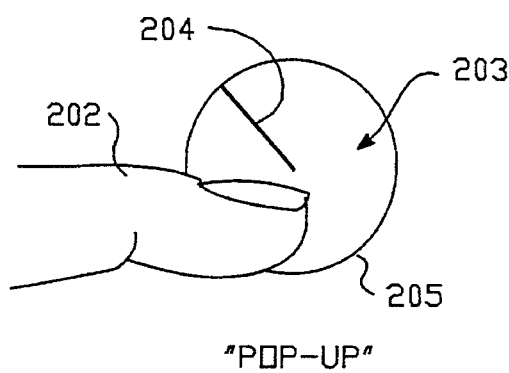
Figure 10F:
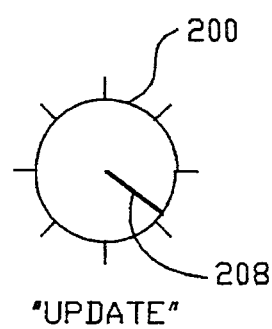

As illustrated in FIG. 10B, a user touches the knob icon 200 with a finger 202. This results in a graphic variable adjustment display 203 being popped up on the screen near the position of the finger 202. This pop-up display is an enlarged version of the knob with a knob handle 204 and a knob background 205. The user positions the finger 202 over the knob handle 204 ("grab") as indicated in FIG. 10D and "drags" the knob handle 204 to a new position, as indicated in FIG. 10E. After dragging the knob handle to a new position, the finger is lifted and the graphical variable adjustment display 203 is removed from the screen. The knob icon 200 will be left, having an indicator 208 showing the updated value of the parameter, as shown in FIG. 10F.

CONCLUSION

Accordingly, the present invention provides an improved touchscreen interface for a music synthesizer or other sound processing system. The touchscreen enables the user to interact with the system parameters in a more direct way than a traditional system of cursor keys, mice, and so on. If a user wants to edit a particular parameter on a page, he or she no longer needs to press cursor keys multiple times. Rather, the user simply touches the parameter and a pop-up graphical variable adjustment display appears. This makes the interface much faster to work with for both end user musicians and voicing personnel. Furthermore, this allows a large number of parameters to be displayed on a single interface, avoiding the problems associated with navigating a hierarchy of windows to adjust a number of parameters associated with a single synthesis performance. The onscreen sliders can be used for a wide variety of parameters associated with music synthesis as suits the needs of a particular device, such as volume, pan, "fx send" settings on mixer channels, attack, brightness, timbre, release, and depth for a variety of sounds in a performance. Thus, multiple parameters may be represented on the screen by icons for display only, while displays used for adjusting the variable pop-up when the icon is touched.

The foregoing description of preferred embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A touchscreen interface for a controller comprising:

a display panel which displays graphical displays;

a touch sensitive panel overlying the display panel which indicates position of a touch over the display panel;

interface processing resources coupled to the display panel and the touch sensitive panel which supply an interface display to the display panel having an icon representative of an adjustable parameter used by the controller, said icon having a size and a position on the touch sensitive panel;

supply a variable adjustment display to the display panel in response to a touch near the position of said icon, the variable adjustment display overlying said interface display and having a size on the touch sensitive panel larger than the size of said icon; and adjust the adjustable parameter and remove the variable adjustment display from the display panel, in response to a touch sequence on the touch sensitive panel over the variable adjustment display.

2. The touchscreen interface of claim 1, wherein the variable adjustment display obscures a portion of the graphical display to facilitate using a finger for the touch sequence.

3. The touchscreen interface of claim 1, wherein the variable adjustment display resembles a slider having a slider bar and a slider background, and the interface processing resources which adjust the variable parameter and remove the variable adjustment display in response to the touch sequence detect a touch near the slider bar on the touch sensitive panel, detect a drag of the touch on the touch sensitive panel to a new position on the slider background representing a selected parameter value, and detect a lift of the touch at the new position.

4. The touchscreen interface of claim 3, wherein the slider background includes a scale indicating a range of possible values for the variable parameter.

5. The touchscreen interface of claim 1, wherein the variable adjustment display resembles a knob having a knob handle and a knob background, and the interface processing resources which adjust the variable parameter and remove the variable adjustment display in response to the touch sequence detect a touch on the knob handle on the touch sensitive panel, detect a drag of the touch on the touch sensitive panel to a new position on the knob background representing a selected parameter value, and detect a lift of the touch at the new position.

6. The touchscreen interface of claim 5, wherein the knob background includes a scale indicating a range of possible values for the variable parameter.

7. The touchscreen interface of claim 1, wherein said icon includes a current value field indicating a current value of the variable parameter, and the interface processing resources update the current value field in response to the touch sequence.

8. The touchscreen interface of claim 1, wherein the variable parameter is used by the controller to control temperature.

9. The touchscreen interface of claim 8, wherein the variable parameter is used by the controller to control speed.

10. The touchscreen interface of claim 8, wherein the variable parameter is used by the controller to control volume.

11. The touchscreen interface of claim 8, wherein the variable parameter is used by the controller to control a characteristic of sound.

12. A user interface on an audio system for adjusting variable parameters associated with sounds, comprising:

a front panel including a graphical display;

a touch sensitive panel over the graphical display on the front panel, which indicates position of a touch over the graphical display; and interface processing resources coupled to the front panel and the touch sensitive panel which supply an interface display to the graphical display having a plurality of icons representative of respective variable parameters used by the audio system, said icons having respective sizes and positions on the touch sensitive panel;

supply a variable adjustment display to the graphical display in response to a touch near the position of a particular icon in the plurality of icons, the variable adjustment display overlying a portion of the interface display; and adjust the variable parameter represented by the particular icon and remove the variable adjustment display from the graphical display, in response to a touch sequence on the touch sensitive panel over the variable adjustment display, the variable adjustment display having a size on the touch sensitive panel larger than the size of said particular icon to facilitate using a finger for the touch sequence, the particular icon appearing similar to a reduced copy of the variable adjustment display.

13. The user interface of claim 12, wherein the variable adjustment display resembles a slider having a slider bar and a slider background, and the interface processing resources which adjust the variable parameter and remove the variable adjustment display in response to the touch sequence detect a touch on the slider bar on the touch sensitive panel, detect a drag of the touch on the touch sensitive panel to a new position on the slider background representing a selected parameter value, and detect a lift of the touch at the new position.

14. The user interface of claim 13, wherein the slider background includes a scale indicating a range of possible values for the variable parameter.

15. The user interface of claim 12, wherein the variable adjustment display resembles a knob having a knob handle and a knob background, and the interface processing resources which adjust the variable parameter and remove the variable adjustment display in response to the touch sequence detect a touch near the knob handle on the touch sensitive panel, detect a drag of the touch on the touch sensitive panel to a new position on the knob background representing a selected parameter value, and detect a lift of the touch at the new position.

16. The user interface of claim 15, wherein the knob background includes a scale indicating a range of possible values for the variable parameter.

17. The user interface of claim 12, wherein at least one icon in the plurality of icons includes a current value field indicating a current value of the represented variable parameter, and the interface processing resources update the current value field in response to the touch sequence.

18. The user interface of claim 12, wherein the front panel includes a music keyboard.

19. The user interface of claim 12, wherein the audio processing system comprises a synthesizer.

20. The user interface of claim 19, wherein the audio processing system comprises a mixer.

21. The user interface of claim 19, wherein the audio processing system comprises a recorder.

22. A method for setting a variable used by a controller having a touchscreen, comprising:

supplying an interface display to the touchscreen having an icon representative of a variable parameter used by the controller, said icon having a size and a position on the touchscreen;

supplying a variable adjustment display to the touchscreen in response to a touch near the position of said icon, the variable adjustment display overlying said interface display and having a size on the touchscreen larger than the size of said icon; and adjusting the variable parameter and removing the variable adjustment display from the touchscreen, in response to a touch sequence on the touchscreen over the variable adjustment display.

23. The method of claim 22, wherein the variable adjustment display obscures a portion of the graphical display to facilitate using a finger for the touch sequence.

24. The method of claim 22, wherein the variable adjustment display resembles a slider having a slider bar and a slider background, and the steps of adjusting the variable parameter and removing the variable adjustment display in response to the touch sequence, include detecting a touch on the slider bar on the touchscreen, detecting a drag of the touch on the touchscreen to a new position on the slider background representing a selected parameter value, and detecting a lift of the touch at the new position.

25. The method of claim 24, wherein the slider background includes a scale indicating a range of possible values for the variable parameter.

26. The method of claim 22, wherein the variable adjustment display resembles a knob having a knob handle and a knob background, and the steps of adjusting the variable parameter and removing the variable adjustment display in response to the touch sequence include detecting a touch on the knob handle on the touchscreen, detecting a drag of the touch on the touchscreen to a new position on the knob background representing a selected parameter value, and detecting a lift of the touch at the new position.

27. The method of claim 26, wherein the knob background includes a scale indicating a range of possible values for the variable parameter.

28. The method of claim 22, wherein said icon includes a current value field indicating a current value of the variable parameter, and further including the step of updating the current value field in response to the touch sequence.

29. The method of claim 22, wherein the interface display includes a plurality of variable icons representing respective variable parameters used by the controller, each of said plurality of variable icons having respective positions and sizes on the touchscreen, the method including supplying a variable adjustment display which corresponds to a particular variable icon in response to a touch at the position of the particular variable icon, the variable adjustment display overlying a portion of the interface display and having a size which enables use of a finger for the touch sequence.

30. The method of claim 22, wherein the variable parameter is used by the controller to control temperature.

31. The method of claim 22, wherein the variable parameter is used by the controller to control speed.

32. The method of claim 22, wherein the variable parameter is used by the controller to control volume.

33. The method of claim 22, wherein the variable parameter is used by the controller to control a characteristic of sound.

34. A method for adjusting parameters associated with sound generated by an audio processing system having a touchscreen, comprising:

supplying an interface display to the touchscreen having a plurality of variable icons representative of respective adjustable parameters used by the audio processing system in producing the synthesized performance, said icons having respective sizes and positions on the touchscreen;

supplying a variable adjustment display to the touchscreen in response to a touch near the position of a particular icon in the plurality of icons, the variable adjustment display overlying said interface display and having a size on the touchscreen larger than the size of said particular icon, the variable adjustment display resembling an enlarged copy of the particular icon; and adjusting the adjustable parameter represented by the particular icon and removing the variable adjustment display from the touchscreen, in response to a touch sequence on the touchscreen over the variable adjustment display.

35. The method of claim 34, wherein the variable adjustment display obscures a portion of the interface display to facilitate using a finger for the sequence of touches.

36. The method of claim 34, wherein the variable adjustment display resembles a slider having a slider bar and a slider background, and the steps of adjusting the variable parameter and removing the variable adjustment display in response to the touch sequence, include detecting a touch near the slider bar on the touchscreen, detecting a drag of the touch on the touchscreen to a new position on the slider background representing a selected parameter value, and detecting a lift of the touch at the new position.

37. The method of claim 36, wherein the slider background includes a scale indicating a range of possible values for the variable parameter.

38. The method of claim 34, wherein the variable adjustment display resembles a knob having a knob handle and a knob background, and the steps of adjusting the variable parameter and removing the variable adjustment display in response to the touch sequence, include detecting a touch on the knob handle on the touchscreen, detecting a drag of the touch on the touchscreen to a new position on the knob background representing a selected parameter value, and detecting a lift of the touch at the new position.

39. The method of claim 38, wherein the knob background includes a scale indicating a range of possible values for the variable parameter.

40. The method of claim 34, wherein said particular icon includes a current value field indicating a current value of the variable parameter, and further including the step of updating the current value field in response to the touch sequence.

41. The method of claim 34, wherein the plurality of variable icons includes icons representing audio parameters including attack, brightness, and release.

42. The method of claim 34, wherein the plurality of variable icons includes icons representing audio parameters including attack, timbre, and volume.

43. The method of claim 34, wherein the plurality of variable icons include icons representing audio parameters including depth.

44. The method of claim 34, wherein the plurality of icons includes icons representing audio parameters including attack, brightness, timbre, depth, release, and volume.

* * * * *